(12) United States Patent
Ehrenberger

(10) Patent No.: US 7,014,239 B2
(45) Date of Patent: Mar. 21, 2006

(54) PROTECTIVE DEVICE FOR A MOTOR VEHICLE CARGO AREA

(75) Inventor: Marina Ehrenberger, Esslingen (DE)

(73) Assignee: BOS GmbH & Co., KG, Ostfildern (DE)

( * ) Notice: Subject to any disclaimer, the term of this patent is extended or adjusted under 35 U.S.C. 154(b) by 0 days.

(21) Appl. No.: 10/778,757

(22) Filed: Feb. 13, 2004

(65) Prior Publication Data

US 2004/0160075 A1 Aug. 19, 2004

(30) Foreign Application Priority Data

Feb. 14, 2003 (DE) ................. 103 07 228

(51) Int. Cl.
*B60R 5/04* (2006.01)
(52) U.S. Cl. .................... 296/37.1; 296/37.16; 296/98
(58) Field of Classification Search ............. 296/37.16, 296/24.4, 136.04, 136.1, 100.15, 37.8, 98, 296/37.15; 160/263, 238, 242
See application file for complete search history.

(56) References Cited

U.S. PATENT DOCUMENTS

| | | | |
|---|---|---|---|
| 5,538,306 A | * | 7/1996 | Ament ..................... 296/37.1 |
| 5,618,077 A | * | 4/1997 | Ament et al. ............ 296/37.16 |
| 5,676,415 A | * | 10/1997 | Ament et al. ............ 296/37.16 |
| 5,813,449 A | * | 9/1998 | Patmore et al. ........ 160/370.22 |
| 5,881,793 A | * | 3/1999 | Righter et al. ........... 160/323.1 |
| 5,934,354 A | * | 8/1999 | Price et al. ............. 160/370.22 |
| 5,961,172 A | * | 10/1999 | Ament et al. ............ 296/37.16 |
| 6,039,105 A | * | 3/2000 | Patmore et al. ................ 160/24 |
| 6,125,908 A | * | 10/2000 | Ament et al. ............ 160/323.1 |
| 6,213,186 B1 | * | 4/2001 | Torres et al. ................... 160/24 |
| 6,488,325 B1 | * | 12/2002 | Ehrenberger et al. .... 296/37.16 |

FOREIGN PATENT DOCUMENTS

| | | |
|---|---|---|
| DE | 44 41 260 | 5/1996 |
| DE | 196 28 699 | 1/1998 |
| DE | 197 35 463 | 3/1999 |

* cited by examiner

*Primary Examiner*—Patricia L. Engle
*Assistant Examiner*—Greg Blankenship
(74) *Attorney, Agent, or Firm*—Flynn, Thiel, Boutell & Tanis, P.C.

(57) ABSTRACT

A protective device for a motor vehicle cargo area includes at least one winding shaft mounted between two casing side parts coaxially movably associated with one another in the longitudinal direction of a winding axis of the winding shaft and fixable in vehicle-secured holders. At least one casing side part of the device is positively locked in a releasable manner in the longitudinal direction of the winding axis in the corresponding vehicle-secured holder by a mechanical locking device.

17 Claims, 2 Drawing Sheets

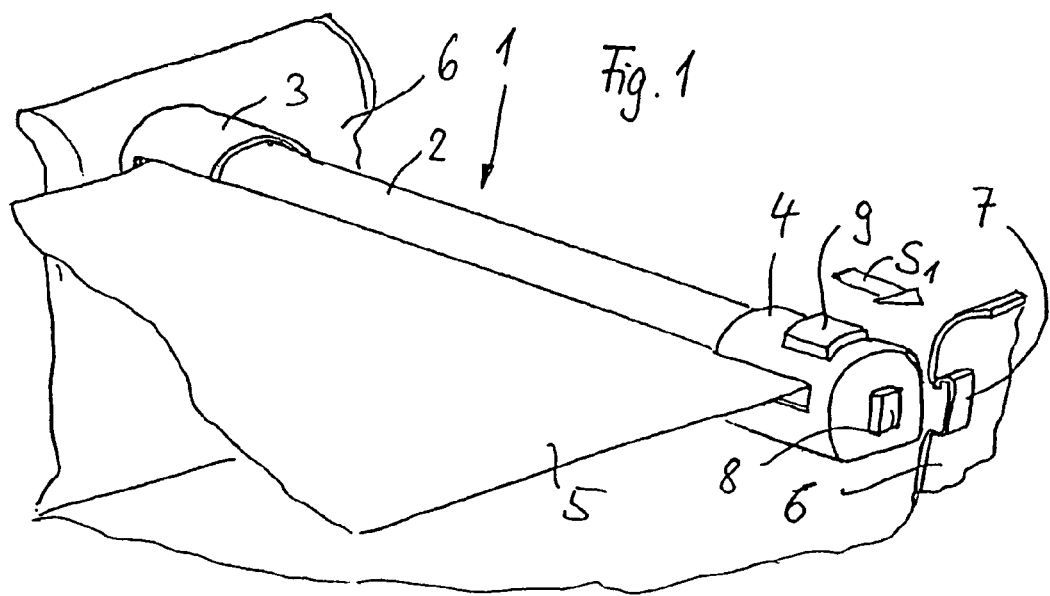
Fig. 1
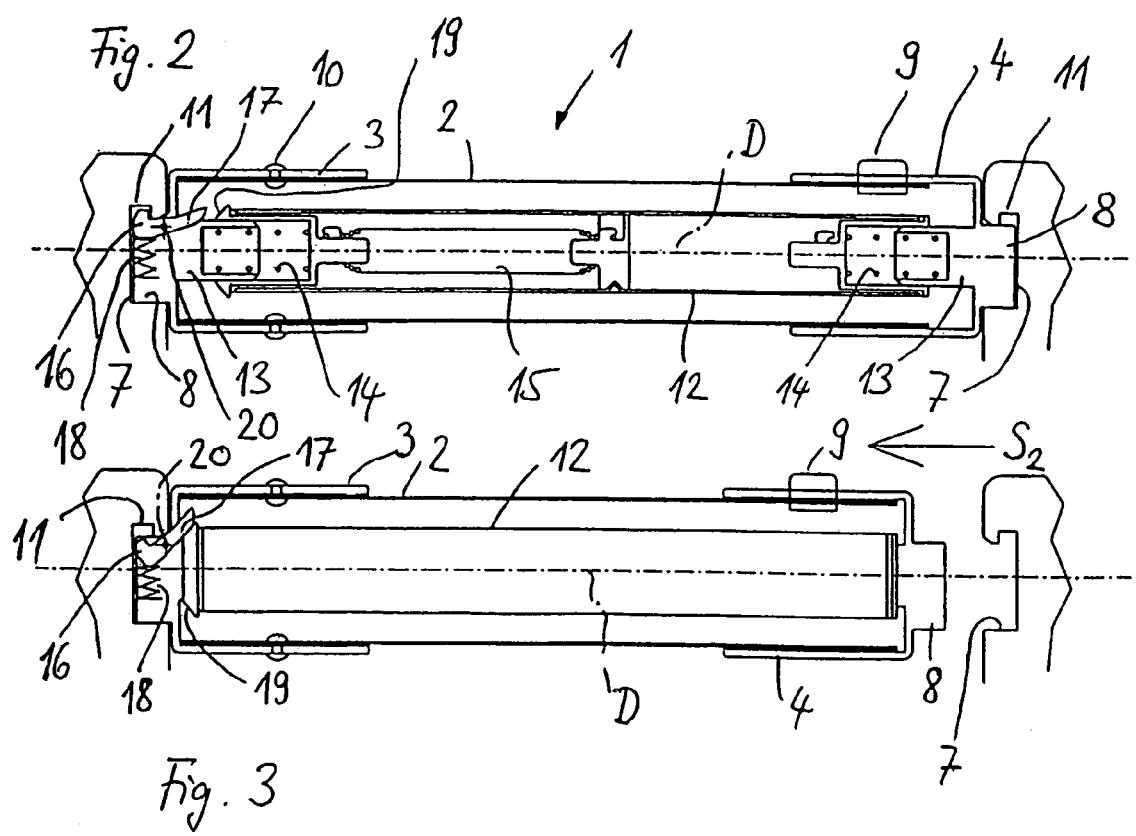
Fig. 2
Fig. 3

PROTECTIVE DEVICE FOR A MOTOR VEHICLE CARGO AREA

The invention relates to a protective device for a cargo, freight or loading area of a motor vehicle having at least one winding shaft, which is mounted between two casing side parts associated in coaxially movable manner in the longitudinal direction of a winding axis of the winding shaft and which can be fixed in vehicle-secured holders.

Such a protective device in the form of a cargo area cover is known from DE 196 21 009 C1. The known cargo area cover has a magazine casing or housing, in which is mounted in rotary manner and in axially floating manner relative to its rotation axis a winding shaft. On the winding shaft is fixed a flexible structure in the form of a tarpaulin, which can be wound onto and from the winding shaft. In its operating position the tarpaulin is spread out roughly horizontally for covering a cargo area. The magazine casing is detachably held in vehicle-side holders, which are preferably located on facing side walls of the cargo area. In order to permit a release and reinsertion of the magazine casing in the vehicle-side holders, the magazine casing is formed by two casing side parts, which engage over the winding shaft from facing ends. The two casing side parts have a cup or hollow profile-like design. One casing side part is shorter than the other casing side part and externally engages over the latter. The shorter casing side part is positioned in axially movable manner relative to the other casing side part. Both casing side parts are provided on their outer ends with journals, which are insertable into corresponding receptacles of the vehicle-side holders. The two casing parts can be pressed axially towards the centre counter to corresponding compressive forces by axial springs, so that they can be locked in an axially shortened release position. This locked position can be manually released, so that the axial springs press the casing side parts outwards into their lengthened fixing position. In said fixing position the magazine casing is fixed in vehicle-side holders, when the journals positively engage in corresponding receptacles of the vehicle-side holders.

In order to prevent the magazine casing being hurled out of the vehicle-side holders in the case of lateral impact loads on the vehicle, between the two casing side parts is provided a locking device, which in the fixing position of the casing side parts brings about a positive locking between the two casing side parts. This prevents a movement of the casing side parts relative to one another, so that the magazine casing is not only secured by the spring tension of the axial springs, but additionally by corresponding positive engagement between the casing parts. Despite the fundamental axial mobility of the two casing side parts relative to one another, in the position blocked by the locking device they behave in a similar manner to a rigid magazine casing.

The problem of the invention is to provide a protective device of the aforementioned type, where a release from vehicle-side holders is prevented in an improved manner when lateral impact loads occur on the motor vehicle.

This problem is solved in that at least one casing side part is locked in the corresponding vehicle-fixed holder by a mechanical locking device in positively releasable manner, relative to a longitudinal direction of the winding axis. The essential idea of the invention is to obtain a positive connection between the protective device and the vehicle-side holder in the winding axis direction. This positive connection is in particular brought about by a claw fastening of at least one casing side part to the vehicle-side holder. As a result of the inventive solution there is a reinforcement of the binding of the protective device, i.e. the casing side part, to the vehicle interior. Preferably the vehicle-side holders are provided on facing side walls of the cargo area. In the sense of the invention, such a protective device is both a purely cargo area cover where, for forming a screen, there is a roughly horizontal extraction of an opaque structure just below a vehicle edge, and a purely separating device, in which preferably a separating net can be extracted roughly vertically upwards in order to permit a separation of the cargo area from a vehicle occupant area. Such a separating device is more particularly used as a retention protection for goods located in the cargo area. Such a protective device also includes a combination of a cargo area cover and a separating device, as well as other types of screen devices. According to the invention, either the mechanical locking device is solely associated with one casing side part or in each case one mechanical locking device is associated with each casing side part.

According to a development of the invention, the casing side parts have different weights and the locking device is associated with the heavier casing side part. In this construction the casing side parts are designed asymmetrically, in that one casing side part also extends over most of the length of the winding shaft and the shorter casing side part is positioned in axially movable manner relative to said longer casing side part. The heavier and longer casing side part is preferably formed in two parts from the front cup part on the one hand and a hollow profile surrounding the winding shaft on the other, the cup part and the hollow profile being fixed together. The other, shorter and lighter casing side part is positioned in axially movable manner relative to the hollow profile on the side opposite to the cup part. This construction is in particular based on the finding that in the case of lateral impact loads a magazine casing with such asymmetrically designed casing side parts is preferably released in the vicinity of the fixing of the heavier casing side part in the associated vehicle-side holder. As a result of the positive locking or claw fastening between the heavier casing side part and the associated vehicle-side holder, it is possible to reliably avoid a release of the protective device from said vehicle-side holder in the case of lateral impact loads.

Through the additional positive binding of the protective device to at least one vehicle-side holder, in the case of lateral impact loads, it is reliably ensured that the protective device is not released from the vehicle-side holders and can be flung around in uncontrolled manner in the vehicle interior or in the cargo area.

According to a further development of the invention the winding shaft is mounted in axially floating manner between the casing side parts and is arranged in centred manner in an axial mid-position by spring tension and the winding shaft is in operative connection with the locking device in such a way that in a release position of the protective device an axial movement of the winding shaft leads to an unlocking of the locking device. Thus, with the aid of the floating mounting of the winding shaft, the locking device is released, so that if need be the protective device can be removed from the cargo area.

According to a further development of the invention the locking device has at least one locking web movably mounted on the casing side part and oriented in its locking position at right angles to the rotation axis of the winding shaft and with which is associated a corresponding locking receptacle on the associated vehicle-side holder. This is a particularly operationally reliable mechanical solution in order to bring about the desired positive engagement in the longitudinal direction of the winding shaft.

According to another development of the invention, on its front side facing the locking device, the winding shaft is provided with a forced guidance device, which cooperates with the locking web in such a way that during an axial displacement of the winding shaft the locking web is transferred into its release position. In a particularly simple design the front side of the winding shaft is bevelled, accompanied by the formation of a wedge surface, a corresponding inclined plane being formed on the locking web. In the case of an axial movement of the winding shaft, the wedge surface and inclined plane slide along one another, so that a forced movement towards the release position is exerted on the locking web. In particularly advantageous manner the locking web is constructed as a pivotably mounted locking lever. With such a construction preferably a corresponding lever arm of the locking lever is oriented in such a way that it forms the starting bevel or wedge surface and pivots the locking lever into its release position when there is an impact of the axially moved winding shaft.

Further advantages and features of the invention can be gathered from the claims and the following description of a preferred embodiment of the invention illustrated in the attached drawings.

FIG. 1 perspectively shows an embodiment of an inventive protective device in a cargo area of a motor vehicle.

FIG. 2 is a diagrammatic sectional representation of the protective device according to FIG. 1 in its position fixed in vehicle-side holders of the cargo area.

FIG. 3 shows the protective device according to FIG. 2 in a release position.

Figure 4:
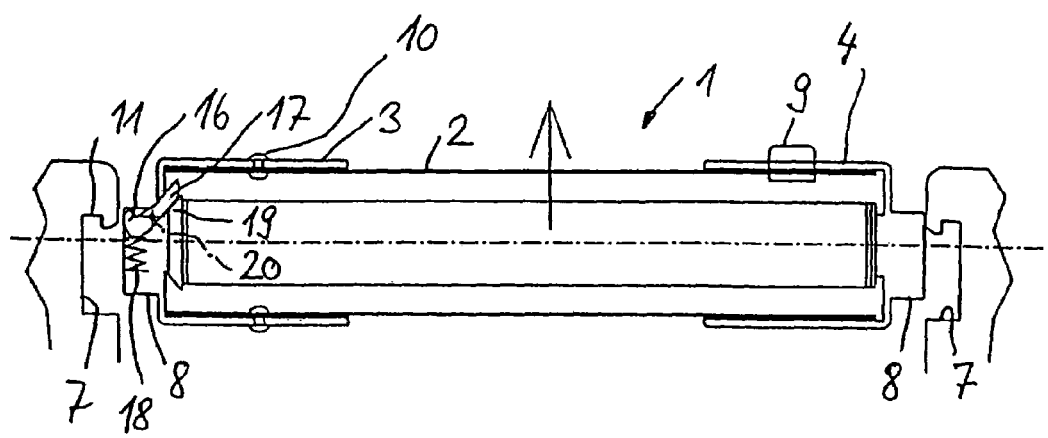
FIG. 4 shows the protective device of FIG. 3 in its removal position.

A protective device for a cargo, freight or loading area of a motor vehicle is in the form of a cargo area cover 1 in the embodiment according to FIGS. 1 to 4. The cargo area cover 1 has a magazine casing, which is located in vehicle-side holders 7 in its operating position. The vehicle-side holders 7 are provided in cargo area side walls 6. The magazine casing is positioned just below a vehicle edge and extends horizontally in the vehicle transverse direction. In its normal operating position, the magazine casing is preferably positioned directly behind a back arrangement of a rear seat not shown to facilitate understanding.

A winding shaft 12 is mounted in a rotary manner about a rotation axis D in the magazine casing. The shaft 12 carries a flexible structure 5, preferably in the form of a non-transparent tarpaulin, which in a fundamentally known manner can be extracted through a slot on a longitudinal side of the magazine casing and is movably arranged between a cover position roughly horizontally covering the cargo area and an inoperative position rolled up and housed in the magazine casing. The winding shaft 12 is in the form of a hollow profile mounted in rotary manner on its facing ends on coaxial journals 13. With the journals 13 are associated centring springs 14 acting towards the shaft centre and which mount in an axially floating manner the winding shaft 12, relative to the rotation axis D. In the hollow profile of the winding shaft 12 is integrated a return spring 15 which spring loads the winding shaft 12 in the winding direction.

The magazine casing of the cargo area cover is formed by two casing side parts 2, 3; 4. One casing side part 2, 3 is frontally provided with a cup-like side part 3, which is extended over the entire length of the winding shaft 12 by a casing hollow profile 2. The casing hollow profile 2 and the cup-like side part 3 are joined together by rivetted joints 10, so that the joint, two-part casing side part 2, 3 is obtained. Thus, the casing side part 2, 3 firstly forms the left-hand end according to FIGS. 2 to 4 and secondly the casing section over the entire length of the winding shaft 12. On the side facing the end closed by the cup-like side part 3, the open face of the casing hollow profile 2 of the casing side part 2, 3 is closed by a further, cup-like side part which, coaxially to the rotation axis D, is axially movably located on the casing hollow profile 2. This side part forms the other casing side part 4, which constitutes the facing, closed end of the magazine casing.

Both the faces of the two casing side parts 2, 3; 4 are in each case externally provided with a fixing cam 8, which is positively held in a holding receptacle 7, in each case matched to the dimensions of the fixing cam 8, of the particular vehicle-side holder in the vehicle longitudinal direction and in the vehicle vertical direction in its operating position (FIG. 2).

The journals 13 are in each case shaped in one piece onto the cup-like side parts and project inwards from the faces of the cup-like side parts 3, 4. Between each journal 13 and a corresponding stop face of the corresponding end of the winding shaft 12 is supported the centring spring 14. The centring spring 14 associated with the casing side part 4 consequently forms a return spring for the axial mobility of the casing side part 4. As the winding shaft 12 is mounted in floating manner, the facing centring spring 14 also contributes to the axial restoring force on the casing side part 4. The centring springs 14, which apply equal spring tensions, also ensure that the winding shaft 12 is always maintained in centered manner in the center within the magazine casing, independently of the actual length of the casing. The actual length of the magazine casing is variable between an inoperative position shown in FIG. 3 and an operating position shown in FIG. 2. A manually operable blocking device 9 serves to fix the casing side part 4 in a non-operative position almost completely engaged on the casing hollow profile 2. Through depressing a control button of the blocking device 9, the casing side part 4 is released for an axial movement, so that the compressive forces of the centring springs 14 press the casing side part 4 axially outwards, so that there is an increase in the overall length of the magazine casing. As a result, it is possible to position and fix the magazine casing in the vehicle-side holders 7. The axially outward movement in FIG. 1 is indicated by the arrow S1 and the axially inward movement in FIG. 3 by the arrow S2.

In order to be able to insert the magazine casing in its vehicle-side holders 7, the casing side part 4 is initially manually axially engaged on the casing hollow profile 2 of the other casing side part 2, 3 until the control button of the blocking device 9 is engaged and the casing side part 4 is fixed in the axially inner position. In this position the magazine casing is manually positioned in the cargo area level with the vehicle-side holders 7 and then by pressing the control button of the blocking device 9 the axial mobility of the casing side part 4 is released. The compressive forces of the centring springs 14 necessarily outwardly press the casing side part 4, so that the fixing cams 8 are inserted in the holding receptacles of the vehicle-side holders 7 and fix the magazine casing in this position.

In order to ensure during lateral impact loads on the vehicle that the magazine casing is not flung out of the vehicle-side holders 7 by impact forces acting in the longitudinal direction of the winding axis D, with the longer and therefore heavier casing side part 2, 3 is associated an additional locking device 11, 16 to 18, 20, which in addition to the positive fixing resulting from the fixing cams 8 and holding receptacles 7 brings about a positive claw fastening in the vehicle transverse direction, i.e. in the longitudinal direction of the winding axis D. For this purpose an undercut 11 is provided in the vicinity of a top surface of the holding receptacle 7 and serves as a locking receptacle and in it engages a locking web 16 of a locking lever 16, 17 in the locked operating position. The locking lever is mounted in tiltable manner about a pivot pin 20 oriented transversely to the winding axis D on the cup-like side part 3 in the vicinity of the fixing cam 8 and is forced towards its locking position by a compression spring 18. The locking web 16 is provided in the vicinity of one lever arm of the locking lever. The other lever arm 17 of the locking lever, relative to the pivot pin 20, is oriented in sloping manner in its locked operating position in such a way that it forms a wedge-like starting face for a conical starting bevel 18 of an associated end of the winding shaft 12. The conical starting bevel and the corresponding wedge face of the lever arm 17 are so matched to one another that an axial movement of the winding shaft 12 pivots upwards the lever arm 17 in the case of an impact of the starting bevel 19, so that as a result of the lever action necessarily the locking web 16 is pivoted downwards and releases the undercut 11 (FIG. 3). An axial movement of the winding shaft 12 towards the centre of the other casing part 2, 3 is initiated by a corresponding axial movement of the casing side part 4. As the blocking device 9 fixes the casing side part 4 in its axially inner inoperative position according to FIG. 3, necessarily also the locking lever is fixed in its release position, so as to permit simple removal of the magazine casing in the arrow direction of FIG. 4. As soon as the magazine casing is inserted again and following the release of the axial mobility of the casing side part 4 through the corresponding control button of the blocking device 9, the casing side part 4 is transferred back into its axially outer operating position, so that the compression springs 14 necessarily centre the winding shaft 12 again in the increased casing centre and consequently remove it from the locking levers 16, 17. Thus, the compressive force of the compression spring 18 necessarily presses the locking web 16 of the locking lever into the undercut 11 of the retaining receptacle 7, which restores the positive claw fastening in the longitudinal direction of the winding axis D.

The claw fastening between the casing side part 2, 3 and the vehicle-side holder 7 in the longitudinal direction of the winding axis D effected in the embodiment according to the invention ensures in the case of a vehicle side impact an adequate securing of the magazine casing in the vehicle-side holders. A flinging round of the magazine casing can consequently be avoided. There is no need for an additional locking unit within the blocking device 9 for the outer operating position of the casing side part 4, as described in DE 196 21 009 C1. The essential idea of DE 196 21 009 C1 was to prevent axial mobility of the casing side parts in the operating position and thereby bring about the function of a rigid magazine casing. The inventive claw fastening between the magazine casing and the vehicle-side holder makes it possible to secure the magazine casing on at least one corresponding, vehicle-side cargo area wall, although the axial mobility of the casing side parts is not prevented during operation. This provides an improved adaptability to tolerances in the spacings between the facing vehicle-side cargo area holders. In a not shown embodiment of the invention, also on the facing casing side part 4, is provided a further claw fastening in much the same way as the locking lever of the casing side part 2, 3. The facing locking receptacle in the form of undercut 11 can be used for this purpose.

The invention claimed is:

1. Protective device for a motor vehicle cargo area with at least one winding shaft, which is mounted in an axially floating manner between two casing side parts coaxially movably associated in a longitudinal direction of a winding axis of the winding shaft, the winding shaft being arranged in a centered manner in an axial mid-position by spring tension, said casing side parts adapted to be received in vehicle-secured holding receptacles, wherein at least one casing side part is locked in a positively releasable manner in a corresponding vehicle-secured holding receptacle by a mechanical locking device that is movable outwardly from said one casing side part relative to the longitudinal direction of the winding axis, and wherein the winding shaft comes into operative connection with the locking device so that an axial movement of the winding shaft in the direction of a release position of the protective device leads to an unlocking of the locking device.

2. The protective device according to claim 1, wherein the casing side parts have different weights and the locking device is associated with the heavier casing side part.

3. Protective device for a motor vehicle cargo area with at least one winding shaft, which is mounted between two casing side parts coaxially movably associated in a longitudinal direction of a winding axis of the winding shaft, said casing side parts adapted to be received in vehicle-secured holding receptacles, wherein at least one casing side part is locked in a positively releasable manner in a corresponding vehicle-secured holding receptacle by a mechanical locking device that is movable outwardly from said one casing side part relative to a longitudinal direction of the winding axis, wherein said locking device includes at least one locking web movably mounted on the casing side part and in a locking position oriented transversely to the winding axis of the winding shaft and with which is associated a corresponding undercut in the associated, vehicle-side holding receptacle.

4. The protective device according to claim 3, wherein a spring device is provided which, by spring tension, urges the locking web toward the locking position.

5. The protective device according to claim 3, wherein the winding shaft is provided on its face facing the locking device with a forced guidance device that cooperates with the locking web so that with an axial displacement of the winding shaft, the locking web is moved into a release position.

6. The protective device according to claim 5, wherein the locking web comprises a pivotably mounted locking lever having a lever arm that is subject to the action of the face of the winding shaft, the face comprising a sloping face defining the forced guidance device.

7. Protective device for a motor vehicle cargo area having first and second holding receptacles, comprising:
   at least one elongate winding shaft for rotating about a longitudinal axis and having first and second ends;
   a protective cover secured to said winding shaft for storage thereon and deployment therefrom;
   a first casing part located at the first end of said winding shaft and having a first casing part face for insertion into a holding receptacle;
   a second casing part located at the second end of said winding shaft and having a second casing part face for insertion into a holding receptacle, wherein at least one of said first and second casing parts is axially movable along the longitudinal axis; and a mechanical locking device comprising a locking web constructed as a pivotably mounted locking lever with a lever arm and a spring mounted to said first casing part at the first end of said winding shaft, wherein said mechanical locking device is movable in a path outwardly from the face of the first casing part and said spring biases said locking lever to extend an end of said locking lever into a locking position to positively lock the protective device in a holding receptacle, the outward path comprising a different path than a path followed by the first casing part face during insertion into a holding receptacle, wherein a face of the winding shaft facing the locking device includes a sloping surface so that during axial movement of the winding shaft toward the first casing part the sloping surface contacts the lever arm and pivots the locking lever to a release position for removal of the first casing part from a holding receptacle.

8. The protective device according to claim 7, wherein the casing parts have different weights and the locking device is associated with the heavier casing part.

9. The protective device according to claim 7, wherein the winding shaft is mounted in an axially floating manner between the casing parts and is arranged in a centered manner in an axial mid-position by spring tension.

10. The protective device according to claim 7, wherein said spring urges said locking web toward the locking position to positively lock the protective device in an undercut in a holding receptacle.

11. The protective device according to claim 7, wherein axial movement of the winding shaft toward the first casing part unlocks the mechanical locking device.

12. The protective device according to claim 7, wherein said mechanical locking device enters an undercut in a holding receptacle when moved outwardly along the path to positively lock the protective device in a holding receptacle, the mechanical locking device preventing release of the protective device due to a lateral force or other force.

13. The protective device according to claim 7, wherein said second casing part is free from a mechanical locking device.

14. Protective device for a motor vehicle cargo area having first and second holding receptacles, comprising:

at least one elongate winding shaft for rotating about a longitudinal axis and having first and second ends;

a protective cover secured to said winding shaft for storage thereon and deployment therefrom;

a first casing part located at the first end of said winding shaft and having a first casing part face for insertion into a holding receptacle;

a second casing part located at the second end of said winding shaft and having a second casing part face for insertion into a holding receptacle, wherein at least one of said first and second casing parts is axially movable along the longitudinal axis;

a mechanical locking device mounted to said first casing part at the first end of said winding shaft, wherein said mechanical locking device is movable in a path outwardly from the face of the first casing part to positively lock the protective device in a holding receptacle, the outward path comprising a different path than a path followed by the first casing part face during insertion into a holding receptacle; and a hollow casing member extending the length of the winding shaft and substantially enclosing the winding shaft and the protective cover, wherein said first casing part is fixedly secured to a first end of said casing member and said second casing part is secured to a second end of said casing member, said second casing part being axially movable with respect to said casing member to vary the length of said protective device.

15. The protective device according to claim 14, further comprising a blocking device for locking the position of said second casing part relative to said casing member, a first fixing cam secured to said first casing part, and a second fixing cam secured to said second casing part, wherein said first and second fixing cams are adapted for insertion into respective holding receptacles, the first fixing cam receiving said mechanical locking device.

16. The protective device according to claim 15, wherein movement of said second casing part relative to said casing member moves said winding shaft axially along the longitudinal axis and relative to said casing member.

17. The protective device according to claim 14, further comprising first and second centering springs mounted at ends of said winding shaft, the first centering spring securing the first end of the winding shaft to the first casing part and the second centering spring securing the second end of the winding shaft to said second casing part, said centering springs being compressible to permit a change in length of said protective device.

* * * * *